United States Patent Office 3,466,257
Patented Sept. 9, 1969

3,466,257
POLYPROPYLENE OF ENHANCED IMPACT STRENGTH
Samuel Howard Coulson, Stockport, England, assignor to Geigy Chemical Corporation, Ardsley, N.Y., a corporation of New York
No Drawing. Filed Jan. 18, 1967, Ser. No. 610,031
Claims priority, application Great Britain, Jan. 28, 1966, 3,849/66
Int. Cl. C08f 45/50
U.S. Cl. 260—30.6      21 Claims

ABSTRACT OF THE DISCLOSURE

Rigid thermoplastic compositions the major portion of which consists of solid crystalline polypropylene and which comprise as low temperature impact strength-enhancing component, 5 to 15% by weight of at least one ester having a solubility parameter within the range of from 9.6 to 10.7, and preferably being an ester containing an aryl, especially a phenyl nucleus in at least one of its alcohol and acid moieties and having a boiling point of not less than 300° C. and being solid at room temperature (20° C.).

---

The present invention relates to polypropylene compositions and, in particular, to polypropylene compositions containing esters.

In the last four years polypropylene has begun to find application in the production of injection mouldings, fibres and films. However, the use of polypropylene has been limited by its relatively poor impact strength at low temperatures. Various attempts have been made to overcome this drawback, for example, by copolymerising propylene with, for instance, ethylene, by blending the polypropylene with an elastomer, usually polyisobutylene or a butyl rubber, or by adding a conventional plasticiser for polyvinyl chloride, cellulosic or other thermoplastic material to the polypropylene. The copolymerisation of polypropylene, although bringing about an improvement in low temperature impact strength, suffers from the disadvantages that it results in poorer stiffness and heat stabiltiy properties compared with normal homopolymerisation, and that more expensive plant is required for the manufacture of copolymers. The rubber modification of polypropylene also brings about an improvement in low temperature impact strength but these modified grades of polypropylene suffer from a serious reduction in rigidity. Although little work has been published in connection with the addition of plasticisers to homopolymers of propylene, Pesta and Sinwell, Der Plastverarbeiter, No. 12, December 1962, pages 643 to 645, and U.S. Patent 3,189,574, have recommended the addition of esters of azelaic or adipic acids, such as di-iso-octyl azelate or di-iso-octyl adipate, to bring about a maximum improvement in the "cold resistance" of polypropylene. In addition, Pesta and Sinwell reported that tritolyl phosphate when employed in a proportion of 20% by weight was unsuitable in this respect because of incompatibility with polypropylene.

Moreover in U.S. Patent No. 3,201,364 there is described the production of plasticized polypropylene compositions having improved flexibility and toughness at both room temperature and below 0° C. while retaining a large measure of its high temperature properties. However, the plasticisers recommended in U.S. Patent No. 3,201,364 are those having a solubility parameter within the range of from about 7 to 9.5 and preferably within the range of from 7.5 to 8.5. The most preferred plasticiser is a liquid paraffin such as that sold under the trade name of Nujol.

We have now found that, unexpectedly, in view of these trends of the art, a surprising and marked improvement in the low temperature impact strength of polypropylene is brought about by the addition of one or more esters having a solubility parameter within the range of from 9.6 to 10.7. In addition, the rigidity and stiffness properties of the unmodified polypropylene are maintained to a surprisingly great extent after the addition of one or more esters having a solubility parameter within this specified range and serving as low temperature impact strength-improving component in polypropylene according to the invention.

According to a first aspect of the present invention there is provided a rigid thermoplastic composition comprising as the major portion thereof solid, crystalline polypropylene and, as low temperature impact-strength enhancing component an ester having a solubility parameter within the range of from 9.6 to 10.7 or a mixture of two or more such esters, the proportion of the ester or mixture thereof being within the range of from 5% to 15% by weight based on the weight of the polypropylene.

The present invention also provides a process of producing a rigid thermoplastic composition which comprises mixing solid, crystalline polypropylene with a proportion of an ester having a solubility parameter within the range of from 9.6 to 10.7, or a mixture of two or more such esters, within the range of from 5% to 15% by weight based on the weight of the polypropylene.

As an alternative to using the aforementioned esters, one may employ dibenzyl ether, di-cresyl glyceryl ether or benzophenone as the impact-strength enhancing component. These compounds are present in the range of from 5% to 15% by weight based on the weight of polypropylene.

The polypropylene component of the composition of the present invention is a homopolymer of propylene preferably having a Melt Flow Index within the range of from 0.1 to 10.0 decigrams per minute, more preferably having a Melt Flow Index within the range of from 1.0 to 6.0 decigrams per minute, the Melt Flow Index being determined using a 2.16 kilogram load at 230° C. according to A.S.T.M. D1238–62T. Moreover, the polypropylene component of the composition of the present invention preferably contains less than 20% of amorphous material, has a specific gravity of at least 0.90 and a molecular weight of at least 10,000.

The ester which is present in the composition according to the present invention may be of any one of a wide variety of chemical classes provided that the solubility parameter of the ester is within the range of from 9.6 to 10.7, more preferably within the range of from 10.0 to 10.4. Preferably also, the ester or mixture thereof which is present in the composition of the invention should be substantially non-volatile at the processing temperature, that is to say the ester or mixture thereof should preferably have a boiling point of not less than 300° C. since otherwise the ester would volatilise either during processing which is often carried out at temperatures up to 300° C., or during prolonged service at elevated temperatures.

In order that the compositions of the present invention will possess good stiffness properties, the ester or mixture of esters component thereof may be solid material at room temperature (approximately 20° C.).

The mixture of two or more esters which may be present in the composition according to the present invention may comprise organic esters alone, inorganic esters alone or organic and inorganic esters, provided that the solubility parameter of each component of the mixture of esters is within the range of from 9.6 to 10.7. These esters preferably contain an aryl, especially a benzene nucleus in at least one of their alcohol and acid moieties.

Examples of esters which may be present in the compositions of this invention include certain members of the following classes of ester: di-aryl-phthalates, alkyl aryl-phthalates, aryl alkyl glycolates, dialkylene glyco dibenzoates and tri-aryl phosphates.

Examples of preferred organic esters which may be present in the compositions according to this invention include dibenzyl phthalate, butyl benzyl phthalate, butyl phthalyl butyl glycolate, diethylene glycol dibenzoate, di-methoxy ethyl phthalate, 1-phenylethyl benzoate, triethylene glycol di-benzoate, benzyl benzoate, ethyl phthalyl ethyl glycolate, phenyl di-glycol carbonate, di-phenoxy ethyl diglycolate, bis (dimethyl benzene) carbonate, methyl phthalyl ethyl glycolate, and glyceryl tribenzoate.

Examples of preferred inorganic esters which may be present in the compositions of this invention include triphenyl phosphate and tri-tolyl phosphate.

The solubility parameter of the ester which is present in the cocposition of the instant invention is calculated in accordance with the procedure described by:

(i) Small, P.A. Journal of Applied Chemistry, Volume 3, No. 71, 1953, and
(ii) Brydson, J. A. Plastics, December 1961, page 107 and gives an approximate measure of the polarity of the ester.

The total proportion of ester or mixture thereof having a solubility parameter within the range of from 9.6 to 10.7 which is present in the composition of the instant invention is within the range of from 5% to 15% by weight based on the weight of the polypropylene; more preferably, however, a total proportion of ester or mixture thereof within the range of from 7.5% to 12.5% by weight based on the weight of polypropylene, is present in the composition of the instant invention.

The composition of the present invention preferably contains one or more stabilisers against heat and oxidation. Such stabilisers are normally present as synergistic mixtures and often contain alkyl di-thio-propionates and hindered phenols. The proportion of such stabilisers or mixtures thereof does not normally exceed 1% by weight based on the weight of the polypropylene.

If desired, other conventional additives may be present in the composition of the instant invention is calculated lubricants, ultra-violet absorbers, anti-static agents, fillers and pigments. If a filler is present, it may be for instance, calcium carbonate, china clay, mica or silica. If a pigment is present it may be an organic pigment or an inorganic pigment.

The process of the present invention may be effected, for instance, using a two-roll mill or a Banbury-type mixer or a compounding extruder or other suitable equipment. Generally any method whereby the ester may be mixed with the molten polypropylene will produce satisfactory results, provided that a uniform mixture of ester and polypropylene is obtained.

The temperature at which the mixing of the polypropylene and the ester is carried out may be, for example, within the range of from 160° to 220° C. but is preferably within the range of from 180° to 200° C.

The compositions of the present invention have, in general, impact strength (as defined hereinafter) at −18° C. which are at least 60% higher than unmodified polypropylene together with improved flow properties. In addition the stiffness and rigidity properties of the compositions of the present invention are comparable with the corresponding properties of unmodified propylene. Accordingly, the compositions of the present invention are useful for wide application in the manufacture of mouldings for use in automobiles, sanitary equipment, domestic and hospital appliances, radio and television appliances, and in the manufacture of fibres and films.

The invention is further illustrated by the following non-limitative examples, parts and percentages shown therein are expressed by weight unless otherwise stated.

Examples 1 to 6

100 parts of a medium molecular weight grade, solid, crystalline homopolymer of propylene having a Melt Flow Index of 3.0 decigrams/minute, 10 parts of dibenzyl phthalate and 0.1 part of a hindered phenol as antioxidant, were mixed on a two-roll mill, the front and rear rolls being maintained at 190° C. and 175° C. respectively. A small portion of the polypropylene was warmed on the stationary rolls for five minutes before the rolls were set in motion. As soon as this portion of the polypropylene had banded, the antioxidant was added, followed by the remainder of the polypropylene. When all the polypropylene had been banded into a homogeneous sheet, the ester was added, commencing with very small additions, which were progressively increased as the milling proceeded. As soon as all the ester had been added and was thoroughly dispersed, the hide was taken off the mill and allowed to cool.

Similar hides were prepared using butyl benzyl phthalate, diethylene glycol dibenzoate, butyl phthalyl butyl glycolate, tri-tolyl phosphate and tri-phenyl phosphate in place of di-benzyl phthalate.

Sample sheets of each of the six hides were then prepared by compression moulding, using the following cycle:

| Time (minutes) | Temperature (° C.) | Procedure | Load (tons) |
| --- | --- | --- | --- |
| 0 | 185 | Charge loaded mould | Holding |
| 10 | 185 | Increase pressure | 10 |
| 15 | 185 | Start cooling and increasing pressure. | 10 |
| 19 | 150 | Maximum pressure at 150° C. continue cooling under pressure. | 80 |
| 23 | 25 | Remove | |

Impact strength tests on each of the six moulded sheets (0.100 inch thick) which had previously been conditioned for at least 5 days at 23° C. and 50% relative humidity were then carried out according to A.S.T.M. D256–56, the results being shown in the following Table I. For the purpose of comparison, data is also shown in Table I for samples of unmodified polypropylene, and samples of the same polypropylene used in Examples 1 to 6, but containing an ester having a solubility parameter outside the range of from 9.6 to 10.7. Each of the comparative samples was prepared using a similar procedure to that described above.

TABLE I

| Example | Ester | Solubility parameter | Impact strength (foot pounds inch) | | | |
|---------|-------|---------------------|------|------|------|------|
| | | | Izod notched at 23° C. | Izod notched at 0° C. | Izod un-notched at −18° C. | Izod un-notched at −50° C. |
| | None | | 0.55 | 0.25 | 4.0 | 3.5 |
| | Di-iso-octyl azelate | 8.5 | 0.60 | 0.30 | 6.1 | 4.0 |
| | Di-iso-octyl adipate | 8.6 | 0.65 | 0.40 | >10.0 | 4.0 |
| | Di-cyclohexyl phthalate [1] | 9.4 | 0.45 | 0.25 | 3.0 | 3.4 |
| 1 | Butyl phthalyl butyl glycolate | 9.6 | 0.80 | 0.45 | >10.0 | >10.6 |
| 2 | Tri-tolyl phosphate | 9.8 | 0.70 | 0.40 | >10.0 | >10.0 |
| 3 | Butyl benzyl phthalate | 9.9 | 0.80 | 0.40 | >10.0 | 7.0 |
| 4 | Tri-phenyl phosphate [1] | 10.0 | 0.80 | 0.50 | >10.0 | >10.0 |
| 5 | Dibenzyl phthalate [1] | 10.4 | 1.0 | 0.60 | >10.0 | >10.0 |
| 6 | Diethylene glycol di-benzoate | 10.7 | 0.70 | 0.50 | >10.0 | 5.0 |
| | A commercially available mixture of N-ethyl o- and p-toluene sulphonamides | 11.0 | 0.60 | 0.45 | 6.0 | 3.5 |

[1] Material solid at 20° C.

The results in Table I clearly demonstrate the improved impact strength properties maintained over a wide range of temperature of each of the exemplified compositions of the invention compared with the same properties of unmodified polypropylene. These results also demonstrate the improved impact strength properties of each of the exemplified compositions of the invention when compared with previously known compositions, namely polypropylene compositions containing an ester slightly outside the the impact strength properties of the compositions of the invention are shown to be superior to known compositions containing di-iso-octyl adipate. Finally, polypropylene compsoitions containing an ester slightly outside the range of from 9.6 to 10.7 are shown in Table I to possess substantially inferior impact strength properties compared with the compositions of the present invention.

Tests were also carried out to determine the Young's Modulus in tensile properties, the tear initiation strengths and the heat ageing properties of certain compositions of the invention. The Young's Modulus in tensile determinations were carried out using as samples Dumbell C (b.S. 903: 15: 1950) cut from compression moulded 0.050 inch thick sheets, and tested at a rate of 2.0 inches per minute. The tear initiation strength properties were evaluated using compression moulded 0.015 inch thick sheets according to the procedure of A.S.T.M. D1004–61. The againg properties of the various samples were evaluated by noting visually the degree of discoloration of the sample after heating at 186° C. for 180 minutes. The following comparative scale of discoloration was then applied to each sample:

0—no discoloration
1—just perceptible discoloration
2—slight discoloration
3—moderate discoloration
4—severe discoloration
5—black The results of the further tests are summarised in the following Table II; for the purposes of comparison data is also included for previously known compositions and for other compositions outside the present invention:

of the present invention compare well with those of unmodified polypropylene. In contradistinction, the rigidity and toughness properties of previously known compositions containing either di-iso-octyl azelate or di-iso-octyl adipate are vastly inferior to those of the compositions of the present invention. Furthermore, the heat ageing results in Table II demonstrate the superiority in this respect of the present compositions compared with previously known compositions and, in certain cases, with unmodified polypropylene.

Further tests were carried out to determine the flow properties of various compositions of the invention. The flow tests were effected by determining the Melt Flow Index of granules of the various samples cut from compression moulded sheets and containing 10% by weight of ester, using a 2.16 kilogram load at 230° C. according to A.S.T.M. D1238–62T. The results obtained are summarised in Table III. For the purpose of comparison, data is also shown in Table III for a sample of unmodified polypropylene, a sample of a copolymer of propylene, and a sample of polypropylene containing 10% by weight of a butyl rubber.

TABLE III

| Example | Ester | Solubility parameter | Melt flow index |
|---------|-------|---------------------|-----------------|
| | None (polypropylene) | | 3.3 |
| | None (copolymer) | | 2.4 |
| | None (polypropylene+10% butyl rubber) | | 3.2 |
| 1 | Butyl phthalyl butyl glycolate | 9.6 | 6.1 |
| 2 | Tri-tolyl phosphate | 9.8 | 6.0 |
| 3 | Butyl benzyl phthalate | 9.9 | 5.6 |
| 4 | Tri-phenyl phosphate | 10.0 | 5.6 |
| 5 | Di-benzyl phthalate | 10.4 | 5.9 |

The results in Table III clearly show the improved flow properties of the compositions of the invention compared with the polypropylene compositions containing no ester additive.

When di-methoxyethyl phthalate, 1-phenylethyl benzoate, tri-ethylene glycol dibenzoate, benzyl benzoate, dibenzyl ether, di-cresyl glyceryl ether, ethyl phthalyl ethyl glycolate, phenyl diglycol carbonate, di-phenoxy ethyl diglycolate, bis (dimethyl-benzene) carbonate, methyl

TABLE II

| Example | Ester | Solubility parameter | Young's modulus in tensile (pounds per square inch) | Tear initiation strength (pounds per inch) | Heat aging |
|---------|-------|---------------------|-----------------------------------------------------|--------------------------------------------|------------|
| | None | | 7.9×10[4] | 780 | 2 |
| | Di-iso-octyl azelate | 8.5 | 4.8×10[4] | 280 | 2–3 |
| | Di-iso-octyl adipate | 8.6 | 4.2×10[4] | 325 | 2 |
| | Di-cyclohexyl phthalate* | 9.4 | 6.2×10[4] | 220 | 2 |
| 1 | Butyl phthalyl butyl glycolate | 9.6 | 7.6×10[4] | 750 | 2 |
| 2 | Tri-tolyl phosphate | 9.8 | 7.2×10[4] | 740 | 2–3 |
| 3 | Butyl benzyl phthalate | 9.9 | 7.4×10[4] | 735 | 1–2 |
| 4 | Tri-phenyl phosphate* | 10.0 | 8.2×10[4] | 720 | 1 |
| 5 | Dibenzyl phthalate* | 10.4 | 7.5×10[4] | 780 | 2 |
| 6 | Diethylene glycol di-benzoate | 10.7 | 7.5×10[4] | 770 | 2 |

*Material solid at 20° C.

The results relating to Young's Modulus and tear initiation shown in Table II clearly establish that the important rigidity and toughness properties of the compositions phthalyl ethyl glycolate, benzophenone, and glyceryl tribenzoate are mixed with polypropylene according to the procedure described in Examples 1 to 6, test data similar

I claim:

1. A rigid thermoplastic composition comprising solid crystalline polypropylene containing less than 20% of amorphous material and, as an impact-strength improving component, at least one ester having a solubility parameter within the range of from 9.6 to 10.7, dibenzyl ether, di-cresyl glyceryl ether, or benzophenone, the proportion of the impact-strength improving component being within the range of from 5% to 15% by weight based on the weight of the polypropylene.

2. A composition as defined in claim 1 wherein the polypropylene has a Melt Flow Index within the range of from 0.1 to 10.0 decigrams per minute.

3. A composition as defined in claim 2 wherein the polypropylene has a Melt Flow Index within the range of from 1.0 to 6.0 decigrams per minute.

4. A composition as defined in claim 1 wherein the polypropylene has a specific gravity of at least 0.90, and a molecular weight of at least 10,000.

5. A composition as defined in claim 2 wherein the impact-strength improving component has a solubility parameter within the range of from 10.0 to 10.4.

6. A composition as defined in claim 1 wherein the impact-strength improving component has a boiling point of not less than 300° C.

7. A composition as defined in claim 1 wherein the impact-strength improving component is a solid material at 20° C.

8. A composition as defined in claim 1 wherein the impact-strength improving component consists of ester containing an aryl nucleus in at least one of its alcohol and acid moieties and having a solubility parameter within the range of from 10.0 to 10.4 and a boiling point of not less than 300° C. and being solid at room temperature.

9. A composition as defined in claim 1 wherein the impact-strength improving component is an organic ester of the class consisting of dibenzyl phthalate, butyl benzyl phthalate, butyl phthalyl butyl glycolate, diethylene glycol dibenzoate, di-methoxy ethyl phthalate, 1-phenylethyl benzoate, tri-ethylene glycol di-benzoate, benzyl benzoate, ethyl phthalyl ethyl glycolate, phenyl di-glycol carbonate, di-phenoxy ethyl diglycolate, bis (dimethyl benzene) carbonate, methyl phthalyl ethyl glycolate, or glyceryl tribenzoate, or a mixture of such esters.

10. A composition as defined in claim 1 wherein the impact-strength improving component is triphenyl phosphate or tritolyl phosphate.

11. A composition as defined in claim 1 wherein the proportion of impact-strength improving component is within the range of from about 7.5% to 12.5% by weight based on the weight of polypropylene.

12. A composition as defined in claim 1 further containing an effective mount of stabilisers against heat and oxidation.

13. A composition as defined in claim 12 wherein the proportion of the stabiliser does not exceed 1% by weight based on the weight of the polypropylene.

14. A composition as defined in claim 1 further containing a lubricant, an ultra-violet absorber, an antistatic agent, a filler and/or a pigment.

15. A composition as defined in claim 14 wherein the filler is calcium carbonate, china clay, mica or silica.

16. A process for producing a rigid thermoplastic composition which comprises mixing solid, crystalline polypropylene having less than 20% of amorphous material with an impact-strength enhancing component selected from the group consisting of esters having a solubility parameter within the range of from 9.6 to 10.7 dibenzyl ether, di-cresyl glyceryl ether and benzophenone, said impact-strength enhancing component being present in an amount sufficient to increase the impact strength of the polypropylene.

17. A process as defined in claim 16 wherein said amount of the impact-strength enhancing component is within the range of from 5% to 15% by weight based on the weight of the polypropylene.

18. A process as defined in claim 16 wherein the polypropylene is melted prior to admixing said impact-strength enhancing component therewith.

19. A process as defined in claim 16 wherein said impact-strength enhancing component is an ester containing an aryl nucleus in at least one of its alcohol and acid moieties and having a boiling point of not less than 300° C. and is solid at room temperature.

20. A process as defined in claim 16 wherein said mixing is carried out at a temperature within the range of from about 160° to 220° C.

21. A process as defined in claim 19 wherein said mixing is carried out at a temperature within the range of from about 180° to 200° C.

References Cited

UNITED STATES PATENTS

| | | | |
|---|---|---|---|
| 3,201,364 | 8/1965 | Salyer | 260—33.6 |
| 3,228,896 | 1/1966 | Canterino et al. | 260—30.6 |

OTHER REFERENCES

Voeks—"Cohesive Energy Density and Internal Pressure of High Polymers," J. Pol. Sci., vol. 2A, 5319–5325 (1964).

JAMES A. SEIDLECK, Primary Examiner

H. H. FLETCHER, Assistant Examiner

U.S. Cl. X.R.

260—31.2, 31.4, 31.6, 31.8, 32.8, 33.2, 41, 45.85, 45.95